Nov. 15, 1938.  J. F. McADAMS  2,136,905

FRAME

Filed June 24, 1938

Inventor:
James F. McAdams

Patented Nov. 15, 1938

2,136,905

UNITED STATES PATENT OFFICE 2,136,905

FRAME

James F. McAdams, West Somerville, Mass., assignor to A. S. Campbell Co., Inc., East Boston, Mass., a corporation of Massachusetts Application June 24, 1938, Serial No. 215,575

11 Claims. (Cl. 40—125)

This invention relates to sectional frames designed particularly for use on automobile license plates and the object is to provide an improved construction for such a frame permitting it to be easily positioned on the plate or withdrawn therefrom when necessary and yet to be firmly held without rattling.

My invention will be well understood by reference to the following description taken in connection with the accompanying drawing, wherein—

Figure 1:
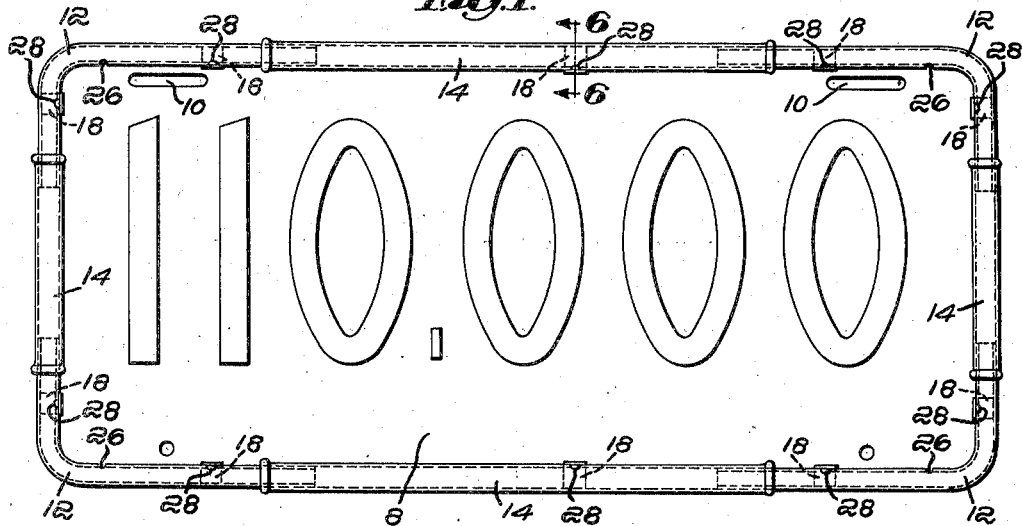
Fig. 1 is a front elevation of a plate having a frame, the construction of which is illustrative of the principles of my invention, applied thereto.
Figure 3:
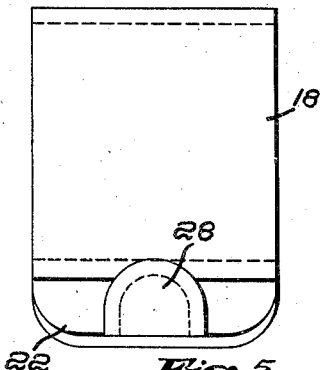
Figs. 3 and 4 are side elevations of the same as seen from the left-hand and right-hand of Fig. 2 respectively.

Referring to the drawing, I have there shown a license plate 8 having the usual openings 10 by means of which it may be bolted to a carrier bracket on the car. The frame herein shown is of the type which is supported by the plate rather than one which is secured to the car and carries the plate. It may comprise a circuit of sections of hollow tubular form, which herein comprise angular corner sections 12 and alternating straight sections 14, the former telescoping within the latter to provide a wide range of adjusting movement among the sections of the frame to permit it to fit license plates of different sizes and all the sections having an inwardly facing slot 16 or opening to receive the margins of the plate. The sections are of substantial cross section to constitute a frame member and are polished or otherwise attractively finished on their outer surface. Herein I have shown the sections as of circular cross section and split along their inner sides to provide the slots 16.

The slots 16, while narrow, maye be of substantially greater width than the normal thickness of the plate 8, and to retain the sections in their encircling position about the plate I provide securing devices which grip the edges of the plate and are retained in the tubular sections by virtue of the incurving margins of the latter at either side of the slots 16 which are in effect overhanging flanges. These securing devices in the embodiment shown are spring clips 18 formed of sheet metal and are relatively short as compared with the sections which they retain. Herein I have shown clips on each arm of the angular corner sections 12 and a clip on the longer straight sections 14 at the top and bottom of the license plate, the shorter sections 14 at the ends of the plate being held by their engagement with the corner sections 12 which telescope therein.

Figure 2:
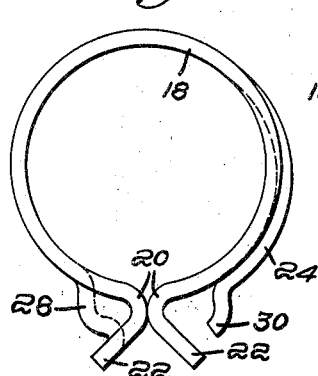
Fig. 2 is an end view on an enlarged scale of a clip used in the construction.
Figure 4:
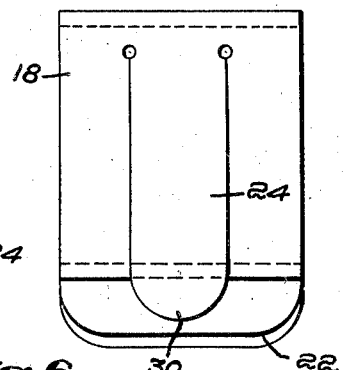
Figure 5:
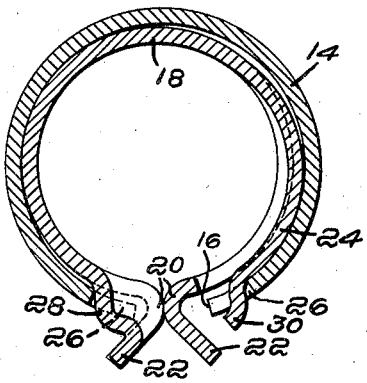
Fig. 5 is a section on an enlarged scale on the plane of the line 6—6 of Fig. 1 but with the license plate removed.
Figure 6:
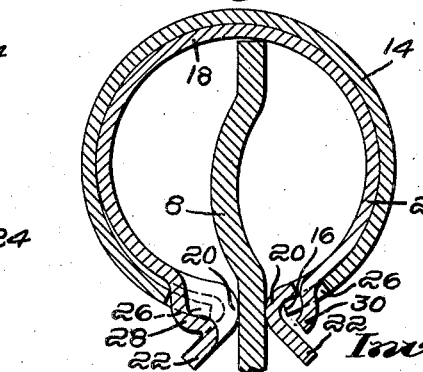
Fig 6 is a section on the line 6—6 of Fig. 1.

The clip 18 herein shown has generally the form of a split annulus which may be slid into one of the tubular sections from the end and which provides at the split opposed jaw portions 20 normally in contact, as shown in Figs. 2 and 5. Short outwardly diverging tabs 22 may be provided as extensions of the clip, which tabs, when the clip is in position in the tubular section as shown in Fig. 5, extend outwardly through the slot and form guiding surfaces to receive the end of the plate which, when pressed in between the jaws 20, is frictionally gripped thereby while the body of the clip is expanded internally of the tubular section 14 (see Fig. 6).

Suitable means may be provided for increasing the frictional grip of the clip on the tubular section. Herein a portion of the cylindrical wall is cut to provide a circumferentially extending spring 24 which normally projects outwardly from the general cylindrical surface of the clip, as shown in Fig. 2, to bind against the wall of the tube 14 when the clip is housed therein.

To prevent longitudinal movement of the clips on the sections, the margins of the latter may be provided with notches 26 at either side of the slots to interlock with the clip. Herein at one end of the clip at the junction of the tab 22 with the body thereof a struck-up projection 28 is provided adapted to engage one of the notches 26, as shown in Fig. 5, being herein pressed into the same by the action of the spring 24. I have herein shown the end of the spring 24 itself as formed with a bent end 30 adapted to engage the opposite notch. To provide a wide range of adjustability the sections may be provided with notches permitting assembly of the clips therewith at any one of a number of points. Thus in Fig. 1 I show additional notches 26 in the horizontal arms of the corner pieces 12 located close to the angle. The clip shown in Fig. 1 as relatively near the end of this arm, if shifted to engage these notches, permits the arm to telescope deeply into the horizontal sections 14.

To secure the frame about the license plate the clips are first assembled with the sections by being inserted through the open ends thereof and are brought to rest by engagement of the locking elements 28 and 30 with notches 26. Ordinarily the several sections are assembled in a circuit considerably larger than the plate and collapsed into position thereon. The edges of the plate are introduced between and guided by the flaring tabs 22 and the sections pressed into position. The clips firmly grip the plate and retain the frame elements in position but the latter may be withdrawn when necessary to change the frame to another plate. No tools are required. The projecting short tabs 22 are inconspicuous in the finished job. The clips 18 may be made of highly resilient material, while the material of the sections themselves as well as their form may be chosen to give the desired appearance.

I am aware that the invention may be embodied in other specific forms without departing from the spirit or essential attributes thereof, and I therefore desire the present embodiment to be considered in all respects as illustrative and not restrictive; reference being had to the appended claims rather than to the foregoing description to indicate the scope of the invention.

I claim:

1. A sectional frame for license plates or the like comprising a circuit of hollow sections having inwardly opening slots of restricted width to receive the edge of the plate, and devices received within the sections adapted to be assembled therewith through the ends thereof but not to be withdrawn through the slots, said devices having opposed jaws resiliently pressed toward each other along lines parallel to the slots, between which jaws the edge of the plate may enter and by which it is held.

2. A sectional frame for license plates or the like comprising a circuit of hollow sections having inwardly opening slots of restricted width to receive the edge of the plate, and devices received within the sections adapted to be assembled therewith through the ends thereof but not to be withdrawn through the slots, said devices having jaws presented respectively at the sides of the slot and resiliently pressed together to grasp the edge of a plate entered therebetween and having relatively short outwardly flaring guiding tabs rising from the jaws and extending through the slot.

3. A sectional frame for license plates or the like comprising a circuit of hollow sections of substantial cross-sectional bulk and means for maintaining the sections of the frame assembled about the plate comprising devices received within sections having parts resiliently pressed together, the devices acting, when a plate is entered between the said parts, to contract in gripping relation on the plate and to expand within the sections in retaining relation thereto.

4. A sectional frame for license plates or the like comprising a circuit of hollow sections having inturned flanges forming inwardly facing slots to receive the edge of the plate and means for securing the frame in embracing position on the plate comprising relatively short members housed in sections and having body portions retained by said flanges and opposed resilient gripping portions presented at the slots and adapted to be forced apart by and to close in gripping relation on the edge of the plate.

5. A sectional frame for license plates or the like comprising a circuit of hollow sections having inturned flanges forming inwardly facing slots to receive the edge of the plate and means for securing the frame in embracing position on the plate comprising metal clips of relatively short length received in sections, the clips having bowed bodies retained by said flanges and opposed yielding jaw portions presented at the slots and adapted to be forced apart by and to close in gripping relation on the edge of the plate.

6. A sectional frame for license plates or the like comprising a circuit of hollow sections having inturned flanges forming inwardly facing slots to receive the edge of the plate and means for securing the frame in embracing position on the plate comprising metal clips of relatively short length received in sections, the clips having bowed bodies retained by said flanges and opposed yielding jaw portions presented at the slots and adapted to be forced apart by and to close in gripping relation on the edge of the plate, and means for providing increased frictional grip of the body portions on the sections in which they are contained.

7. A sectional frame for license plates or the like comprising a circuit of hollow sections having inturned flanges forming inwardly facing slots to receive the edge of the plate and means for securing the frame in embracing position on the plate comprising metal clips of relatively short length received in sections, the clips having bowed bodies retained by said flanges and opposed yielding jaw portions presented at the slots and adapted to be forced apart by and to close in gripping relation on the edge of the plate, and means for providing increased frictional grip of the body portions on the sections in which they are contained comprising a spring tongue formed thereon.

8. A sectional frame for license plates or the like comprising a circuit of hollow sections having inturned flanges forming inwardly facing slots to receive the edge of the plate and means for securing the frame in embracing position on the plate comprising metal clips of relatively short length received in sections, the clips having bowed bodies retained by said flanges and opposed yielding jaw portions presented at the slots and adapted to be forced apart by and to close in gripping relation on the edge of the plate, the margin of a slot having a notch in which a portion of a clip engages to position it longitudinally in the section.

9. A sectional frame for license plates or the like comprising a circuit of hollow sections having inturned flanges forming inwardly facing slots to receive the edge of the plate and means for securing the frame in embracing position on the plate comprising metal clips of relatively short length received in sections, the clips having bowed bodies retained by said flanges and opposed yielding jaw portions presented at the slots for gripping the edge of the plate, the flange having an opening adjacent the slot and the clip a projection to engage the same.

10. A sectional frame for license plates or the like comprising a circuit of hollow sections having inturned flanges forming inwardly facing slots to receive the edge of the plate and means for securing the frame in embracing position on the plate comprising metal clips of relatively short length received in sections, the clips having bowed bodies retained by said flanges and opposed yielding jaw portions presented at the slots for gripping the edge of the plate, the flange having an opening adjacent the slot and the clip a projection to engage the same, the clip further carrying a spring pressing against the inner wall of the section and normally tending to hold the projection engaged in the opening.

11. A sectional frame for license plates or the like comprising a circuit of hollow sections having inturned flanges forming inwardly facing slots to receive the edge of the plate and means for securing the frame in embracing position on the plate comprising narrow, resilient, sheet metal clips received in sections, each clip comprising a strip bent to provide a generally circular body fitting within the section and flaring terminals adapted to project through the slot and forming a guideway for the entrance of the plate, the section having openings at its margins, an expressed projection at the base of one terminal of the clip adapted to enter an opening, a circumferentially extending strip cut from the body of the clip to form a spring normally projecting outwardly therefrom, the free end of the strip being disposed adjacent the other terminal of the clip and having a portion adapted to engage in one of the openings.

JAMES F. McADAMS.